United States Patent [19]
Okada et al.

[11] Patent Number: 5,515,747
[45] Date of Patent: May 14, 1996

[54] AXLE DRIVING SYSTEM

[75] Inventors: Hideaki Okada; Kenji Shiba, both of Amagasaki, Japan

[73] Assignee: Kanzaki Kokyukoki Mfg. Co. Ltd., Amagasaki, Japan

[21] Appl. No.: 391,001

[22] Filed: Feb. 21, 1995

Related U.S. Application Data

[63] Continuation of Ser. No. 99,444, Jul. 30, 1993.

[51] Int. Cl.$^6$ ....................................... F16H 57/02
[52] U.S. Cl. ............................ 74/606 R; 60/456; 475/159
[58] Field of Search ............... 74/606 R; 60/456, 60/487; 475/159, 200; 91/46; 184/81, 96, 106, 108

[56] References Cited

U.S. PATENT DOCUMENTS

| | | | |
|---|---|---|---|
| 1,840,875 | 1/1932 | Rayburn | 60/456 |
| 2,646,319 | 7/1953 | Wideman | 184/108 |
| 2,800,083 | 7/1957 | Tweedale et al. | 60/456 |
| 3,309,870 | 3/1967 | Pinkerton | 60/456 |
| 3,368,760 | 2/1972 | Lamm | 184/108 |
| 4,979,583 | 12/1990 | Thoma et al. | 180/62 |
| 4,987,796 | 1/1991 | von Kaler et al. | 74/606 R |
| 5,031,403 | 7/1991 | Okada | 60/487 X |
| 5,090,949 | 2/1992 | Thoma et al. | 475/200 X |
| 5,259,194 | 11/1993 | Okada | 60/456 |
| 5,289,738 | 3/1994 | Szulczewski | 74/606 R |
| 5,317,936 | 7/1994 | Shiba et al. | 74/606 R |

FOREIGN PATENT DOCUMENTS

| | | | |
|---|---|---|---|
| 2-54964 | 4/1990 | Japan. | |
| 5-26329 | 2/1993 | Japan | 74/606 R |

*Primary Examiner*—Allan D. Herrmann
*Assistant Examiner*—Troy Grabow
*Attorney, Agent, or Firm*—Sterne, Kessler, Goldstein & Fox

[57] ABSTRACT

An axle driving system, wherein a first chamber and a second chamber partitioned from each other are formed in a housing, a hydraulic non-stage transmission is housed in the first chamber, axles and means for transmitting power from the transmission to the axles is housed in the second chamber. At the upper portion of the housing is disposed an oil storage tank positioned across the first and second chamber. Oil through-bores for flowing oil therethrough are provided in the first and second chambers respectively. At the oil storage tank are provided means in common to charge oil into each chamber. Means for observing oil quantity, and breather means for ventilating outside air are also provided. The first and second chambers are not in direct fluid communication with each other, so that the hydraulic non-stage transmission is not adversely effected by foreign objects, such as iron powder or air bubbles produced by the differential gear, thereby improving durability and reliability and lowering the manufacturing cost.

15 Claims, 11 Drawing Sheets

AXLE DRIVING SYSTEM

This application is a continuation of application Ser. No. 08/099,444, filed Jul. 30, 1993.

BACKGROUND OF THE INVENTION

1. Field of the Invention

The present invention relates to an axle driving system which houses an oil reservoir. Oil is fed from the oil reservoir into a chamber housing either a hydraulic non-stage transmission or a differential gear and axles, so that, while the hydraulic non-stage transmission is operating, oil agitated by the differential gear and containing air bubbles does not affect the performance of the hydraulic non-stage transmission.

2. Prior Art

Oil which is stored in a chamber containing a hydraulic non-stage transmission expands as it is heated by the operation of the transmission. The conventional technique of using an oil reservoir tank to accommodate the overflow of oil stored in the chamber is well known. Such techniques include the use of a separate oil reservoir tank, a separate oil reservoir tank made of retractable material, or the provision of a space corresponding to an oil reservoir provided in the transmission housing. The latter is disclosed in Japanese Utility Model Laid-Open No. Hei 2-54964 and in U.S. Pat. No. 4,987,796.

Each of these techniques has its own problems associated therewith. For example, when the reservoir tank is provided in a space in the housing, a long pipe is still required to connect the reservoir tank to the transmission housing. Such an arrangement increases the manufacturing time by increasing the handling of the same. When a retractable material is used in the housing, the manufacturing costs required to erase durability and reliability of the material increase. Further, air disposed within the reservoir tank mixes with the oil when the housing is agitated during use, causing air bubbles to form in the oil. Thus, when the oil is fed into the closed circuit of the hydraulic non-stage transmission, the air bubbles decrease the efficiency of the transmission, resulting in greater noise and lower durability.

In order to eliminate such defects, this inventor has previously disclosed, in pending U.S. patent application Ser. No. 07/917,583, a construction whereby a container for oil including a layer of air disposed above the oil in the container is provided in the housing. The oil can freely interact with oil in the housing, which leaves room for improving the manufacturing cost and structural efficiency of the construction. The present invention is an improvement in this previous construction.

SUMMARY OF THE INVENTION

In the axle driving system of the present invention, a first chamber and a second chamber are partitioned from each other within a sealed housing. The first chamber contains a hydraulic non-stage transmission. The second chamber contains axles and transmitting means for connecting the axles. The upper portion of the sealed housing houses an oil storage tank which spans the first and second chambers. The first and second chambers are provided with oil through-bores for oil to flow therethrough. The oil storage tank is positioned above the first chamber so that oil fills the first chamber and covers the interior thereof. Oil charge means are positioned in common in the oil storage tank for charging oil into the respective chambers. Oil observation means for observing oil quantity, and a breather for ventilating outside air are also provided in the oil storage tank. The first and second chambers are not in direct fluid communication with each other, so that the hydraulic non-stage transmission is not affected by foreign objects, such as, iron powder or air generated by the differential gear. The breather improves durability and reliability and lowers the manufacturing cost of the hydraulic non-stage transmission.

DESCRIPTION OF THE PREFERRED EMBODIMENT

Figure 1:
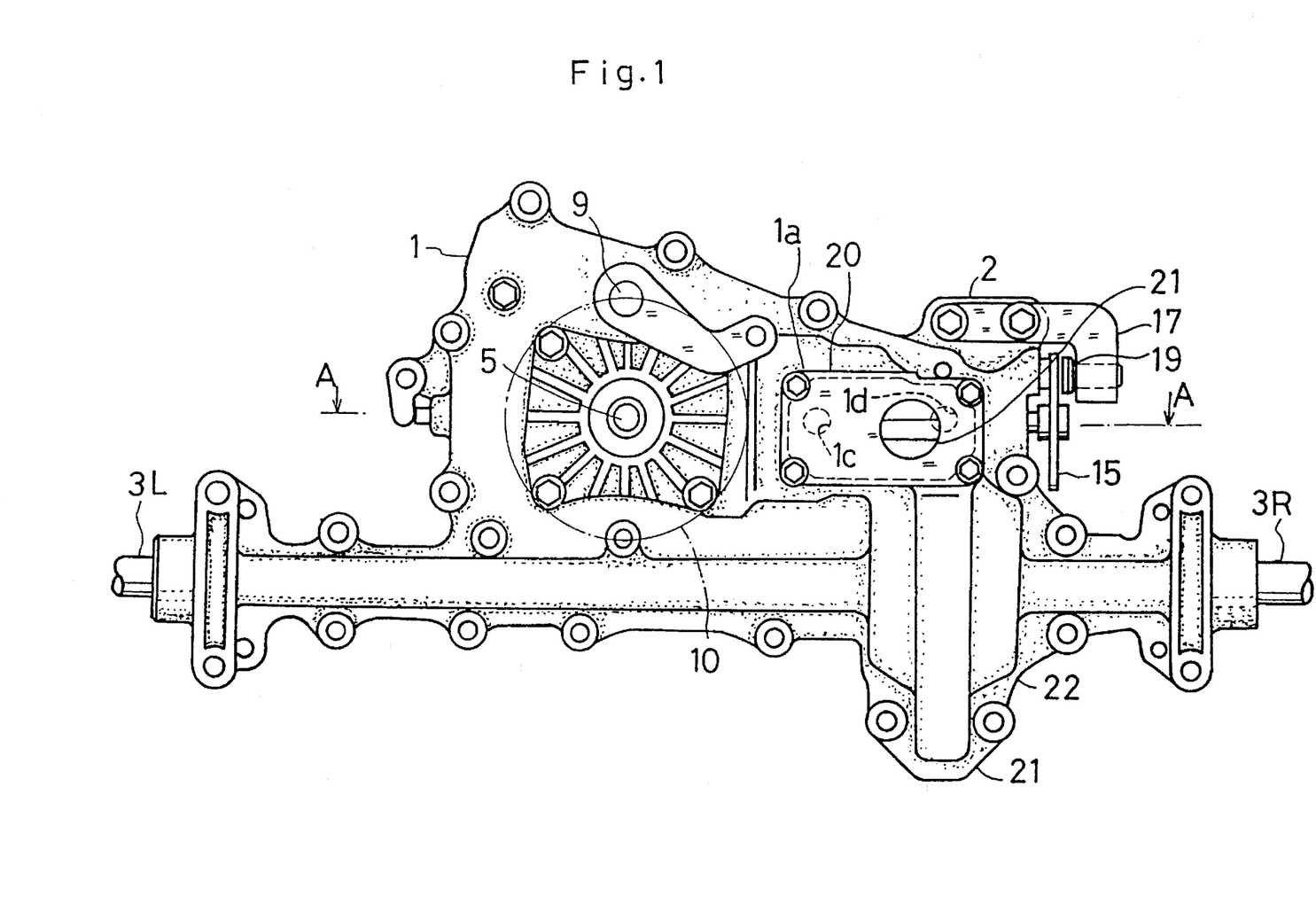
FIG. 1 is a top plan view of the hydraulic transmission of the present invention.

Explanation will now be given of FIGS. 1, 2 and 3, in which an axle driving system is constructed so that a hydraulic non-stage transmission K, a differential gear J and axles 3L and 3R, are integrally disposed in a housing. An upper housing member 1 and a lower housing member 2 are coupled along a substantially flat surface to form a unitary housing. The hydraulic non-stage transmission K includes a hydraulic pump P and a hydraulic motor M, both mounted on a center section 4 and hydraulically coupled with each other. Center section 4 is substantially L-shaped in cross-section, and its horizontal portion extends in parallel to the coupling surface of housing members 1 and 2 and is fixed to upper housing member 1.

Input shaft 5 of hydraulic pump P is rotatably mounted to a pump mounting surface of center section 4 and extends vertically. Output shaft 11 of hydraulic motor M extends horizontally from center section 4. Power is transmitted from an engine (not shown) to a pulley 10, which is fixed to the upper end of input shaft 5, so that input shaft 5 rotates and drives hydraulic pump P. Hydraulic pump P is of the axial plunger piston type with a cylinder block 8a rotatable by input shaft 5. A plurality of pistons 8b are projectable from and retractable in cylinder block 8a. A swash plate 8 abuts against pistons 8b.

Figure 6:
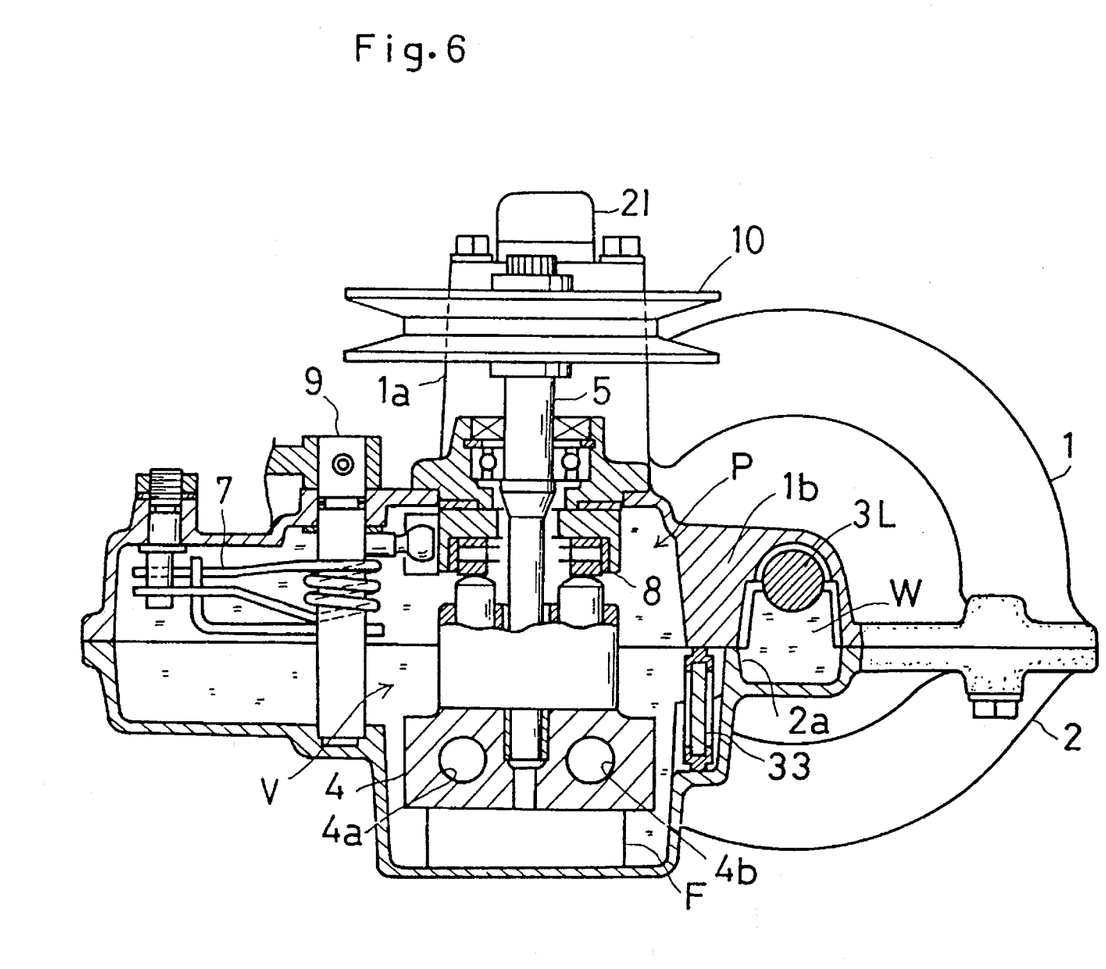
FIG. 6 is a cross-sectional view taken along line 6—6 of FIG. 2.

Hydraulic pump P is of the variable volume type and can adjust the discharge amount and discharge direction by slanting swash plate 8 toward the left or right from a neutral position. As shown in FIG. 6, swash plate 8 can be slanted by rotation of a speed change shaft 9. Spring 7 returns swash plate 8 to the neutral position.

Figure 9:
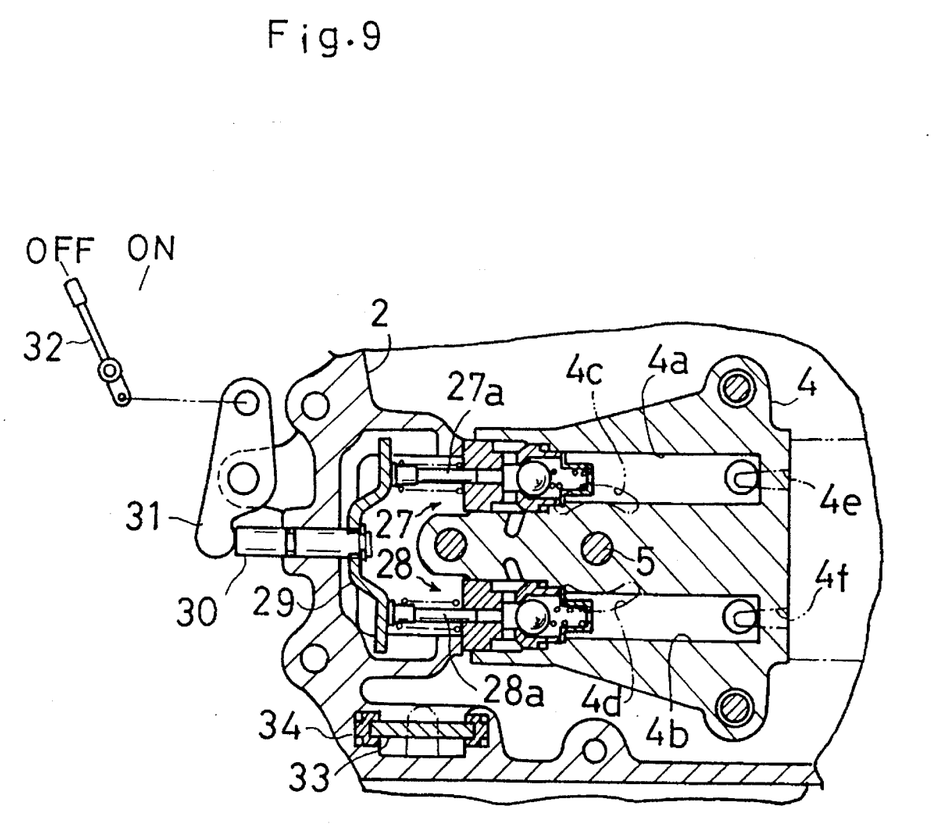
FIG. 9 is a cross-sectional plan view of a by-pass operation unit of the present invention.

Center section 4 contains bored oil passages 4a and 4b. As shown in FIG. 9, oil passages 4a and 4b link kidney ports 4c and 4d formed on the hydraulic pump mounting surface of center section 4 with the kidney ports 4e and 4f formed on the hydraulic motor mounting surface of center section 4, thereby forming a closed hydraulic circuit. Pressure oil discharged from hydraulic pump P passes through the closed circuit in center section 4 and is fed in circulation to hydraulic motor M.

Figure 2:
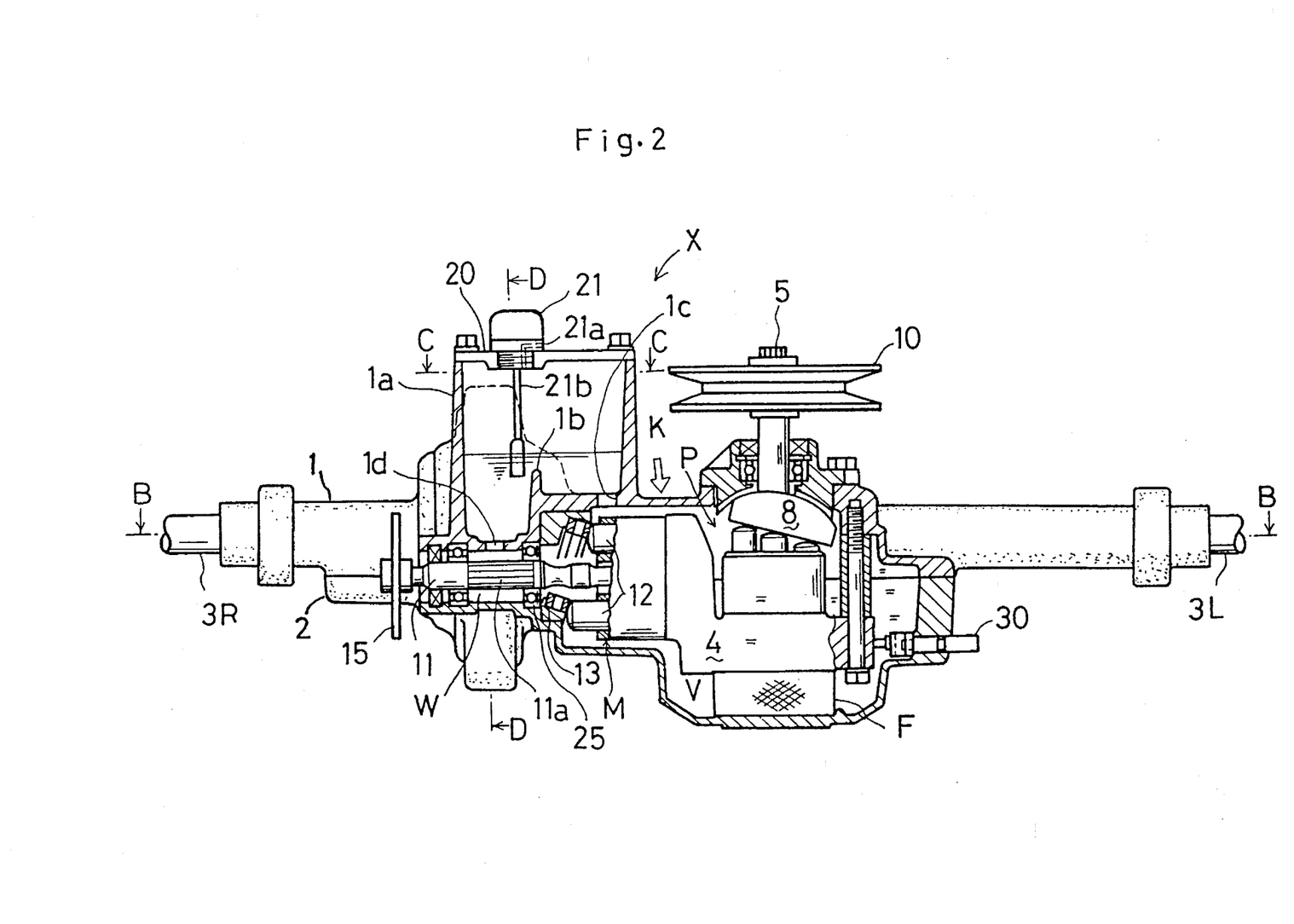
FIG. 2 is a cross-sectional view taken along line 2—2 of FIG. 1.

Hydraulic motor M, as shown in FIG. 2, is also of the axial plunger piston type provided with an output shaft 11, a cylinder block 12a integrally rotatable therewith, a plurality of pistons 12 projectable from and retractable in cylinder block 12a, and a swash plate 13 resting against the heads of pistons 12. Swash plate 13 is sandwiched between upper housing member 1 and lower housing member 2 so as to remain fixed. Accordingly, hydraulic motor M is of the fixed volume type. Gear 11a is knurled on output shaft 11. As shown in FIG. 3, gear 11a engages with a ring gear 14 of differential gear J, thereby driving axles 3L and 3R through a bevel gear mechanism disposed in ring gear 14. Differential gear J differentially connects the left axle 3L and right axle 3R.

Figure 3:
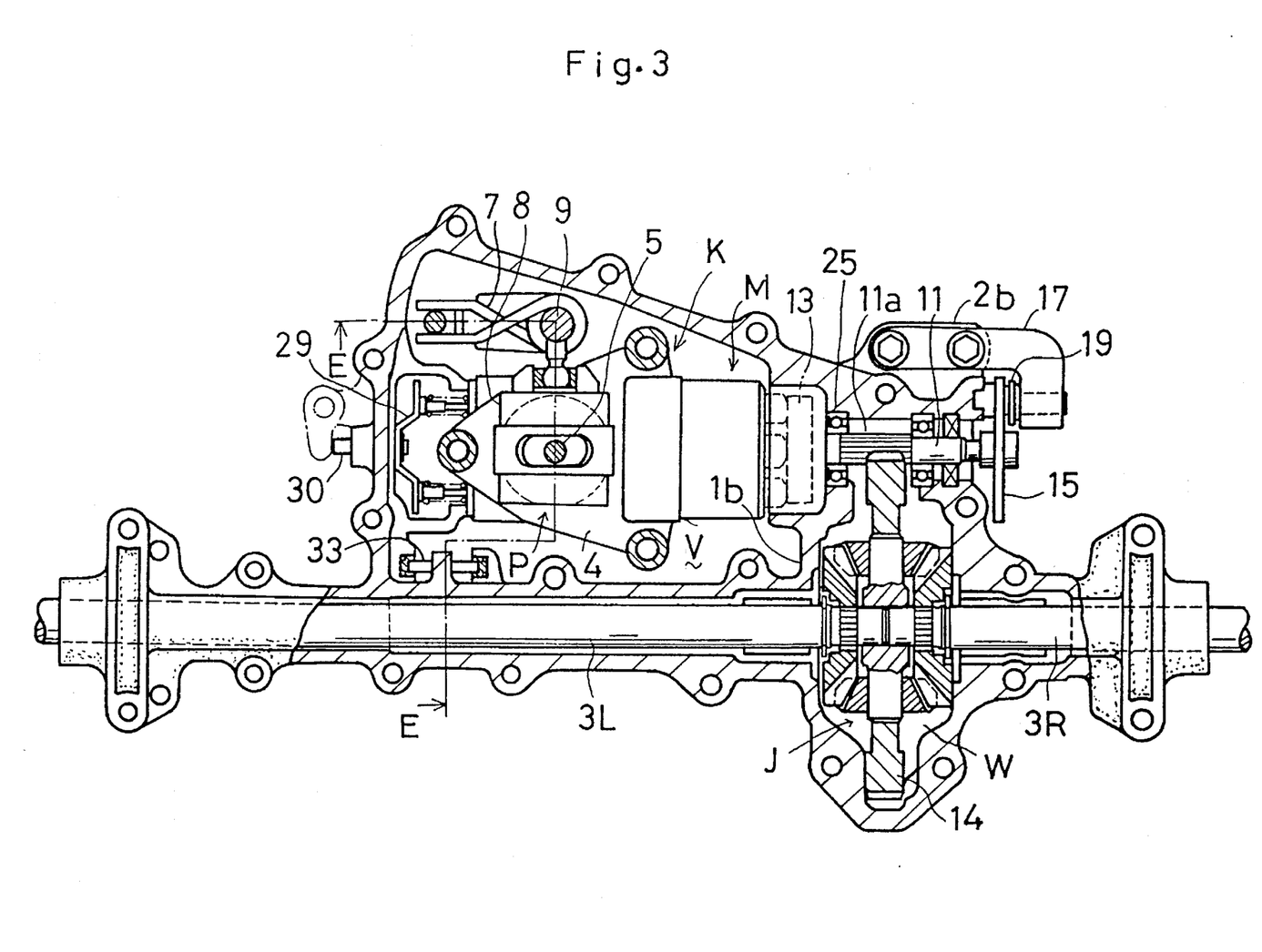
FIG. 3 is a cross-sectional view taken along line 3—3 of FIG. 2.

The interior of the housing, as shown in FIG. 3, is partitioned into a first chamber V for housing therein hydraulic non-stage transmission K and a second chamber W for housing therein differential gear J and axles 3L and 3R. A partition wall is constructed by joining a wall 1b formed in upper housing member 1 and a wall 2a formed in lower housing member 2. When upper housing member 1 and lower housing member 2 are joined, walls 1b and 2a form a partition wall.

Walls 1b and 2a contain a bearing 25 with an oil seal sandwiched therebetween. Output shaft 11 of hydraulic non-stage transmission K extends through bearing 25 and connects with differential gear J. Accordingly, while hydraulic non-stage transmission K and axles 3L and 3R are in the power coupling state, first chamber V and second chamber W are not in direct fluid communication with each other.

As shown in FIG. 2, an upwardly projecting enclosure 1a is integrally formed at the upper surface of upper housing member 1 and across first chamber V and second chamber W. Enclosure 1a is used as an oil reservoir X for oil storage. Oil reservoir X is open at the upper end of housing member 1 and closed by a lid 20. Lid 20 contains an oil charge port which is closed by a plug 21 integrally formed of a breather unit 21a and an oil gauge 21b for inspecting the amount of oil. Breather unit 21a allows the interior of oil reservoir X to interact with the atmosphere and is adapted not to take in foreign objects, such as dust, while allowing variation in the oil level in oil reservoir X.

Figure 4:
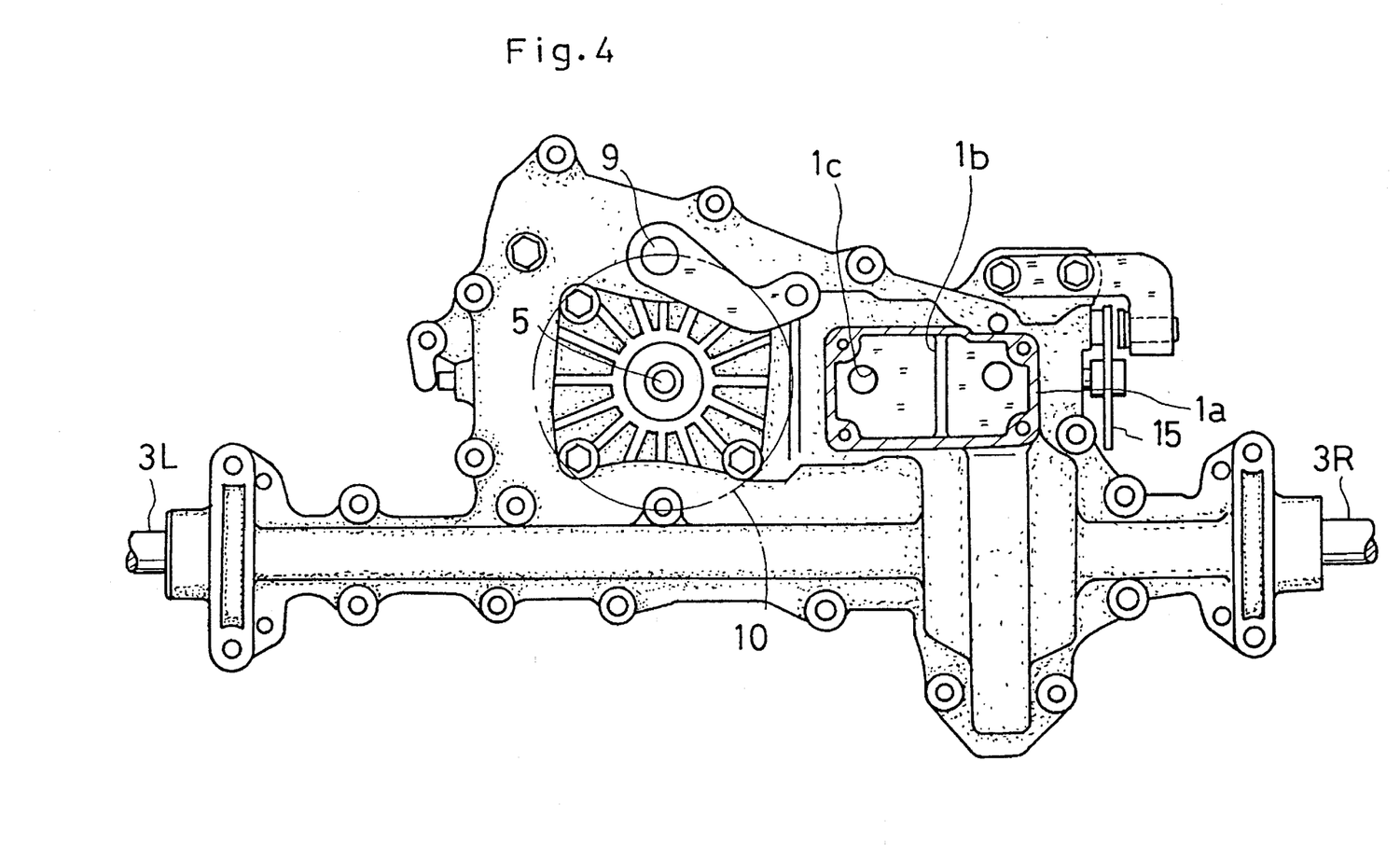
FIG. 4 is a cross-sectional view taken along line 4—4 of FIG. 2.

As shown in FIGS. 2 and 4, bores 1c and 1d are open at the bottom surface of oil reservoir X so that bore 1d communicates through oil reservoir X with second chamber W, and bore 1c communicates through oil reservoir X with first chamber V. First chamber V and second chamber W are not in direct fluid communication with each other. A partition 1b projects from the bottom surface of oil reservoir X so as to partition the oil from bore 1c and the oil from bore 1d.

Oil reservoir X, comprising enclosure 1a projecting upwardly from the outer wall of upper housing member 1 and bores 1c and 1d, can be machined simultaneously with upper housing member 1 when molded, thereby improving productivity.

In addition, in the disclosed embodiment, bore 1c is open above hydraulic motor M, and bore 1d is open above gear 11a. The positions of bores 1c and 1d are not limited to the above, as long as bores 1c and 1d are able to communicate with the first and second chambers, respectively.

After the axle driving system is assembled, plug 21 is removed to allow oil to be fed into oil reservoir X through the oil charge port provided in lid 20, so that first chamber V is filled with oil from oil reservoir X through bore 1c, and second chamber W is filled with oil through bore 1d. Hence, oil can be fed into first chamber V and second chamber W through the single oil charge port in one stroke, thereby reducing the time required for oil-charge work.

First chamber V is positioned below oil reservoir X such that first chamber V is filled therein with oil and its oil level covers the interior of oil reservoir X through bore 1c. When heat from the operation of hydraulic non-stage transmission K causes the oil in first chamber V to expand, the oil flows in reverse to oil reservoir X through bore 1c, thereby adjusting the oil quantity. When the oil contracts, similarly, oil flows back into first chamber V from oil reservoir X.

Figure 5:
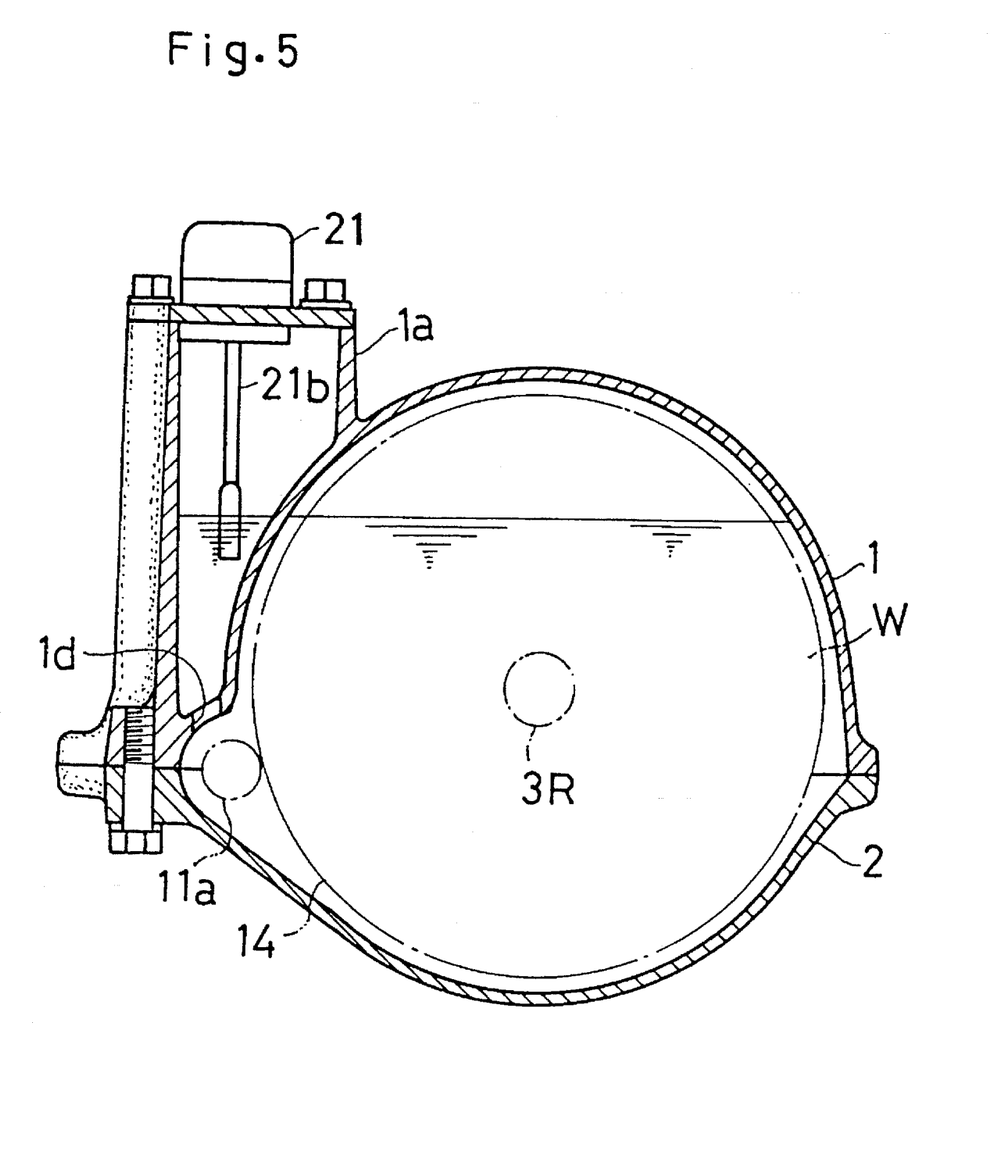
FIG. 5 is a cross-sectional view taken along line 5—5 of FIG. 2.

On the other hand, oil in second chamber W, as seen from FIG. 5, is not filled therein, because no more oil than necessary is fed in second chamber W to avoid a power loss and reduce weight. The oil lubricates the engaging portion of gear 11 and the rotatable portion of differential gear J and axles 3L and 3R. In second chamber W the air layer rests above the oil level, whereby, when differential gear J rotates to agitate the oil, air is mixed therein. Since first chamber V does not directly communicate with second chamber W, the oil including air generated in second chamber W by gear-agitating enters into oil reservoir X through bore 1d. However, bubbles float to the top of oil reservoir X, thereby never entering first chamber V. Accordingly, the oil in first chamber V never collects air bubbles. The oil in first chamber V is taken in by check valves 27 and 28 (see FIG. 9) of hydraulic non-stage transmission K, so that, when the oil is fed into the closed circuit, the air bubbles are not carried into the closed circuit. Thus, the volume efficiency of hydraulic non-stage transmission K never lowers and noises are never generated, thereby improving durability.

As shown in FIGS. 3 and 6, a magnet 33 is provided at a predetermined position of first chamber V. A rubber magnet cover 34 covers magnet 33, and sits in a receiving portion formed in the housing. After the housing is assembled, magnet cover 34 is compressed by upper housing member 1 and lower housing member 2 so as to be fixed therebetween. Iron dust or the like produced in first chamber V attaches to the surface of magnet 33, thereby purifying the oil in first chamber V.

Oil passages 4a and 4b provided at center section 4 are bored in parallel to each other and check valves 27 and 28 are mounted at the front ends thereof in parallel. Check valves 27 and 28 are adapted to open by self-absorption so as to feed the oil stored in the housing into the closed circuit. An oil filter F (see FIG. 2) in first chamber V filters the oil therein when taken in the closed circuit through check valves 27 and 28. Also, opening pins 27a and 28a (see FIG. 9) are disposed in parallel to the axes of check valves 27 and 28. Check valves 27 and 28 can be opened by depressing opening pins 27a and 28a thereby communicating with first chamber V.

An urging plate 29 abuts the ends of both opening pins 27a and 28a, and is situated in lower housing member 2.

Urging plate 29 slides axially of each check valve 27 or 28. Also, a push pin 30 is loosely retained at the center of urging plate 29. A retaining bore, slightly larger in diameter than the outer diameter of push pin 30, holds push pin 30 so that the urging plate is freely slanted with respect to the axis of push pin 30. Push pin 30 is freely slidable in and out of lower housing member 2. One end of push pin 30 projects out of lower housing member 2 and abuts an arm 31. The other end of push pin 30 is connected through a rod or the like to a by-pass lever 32 provided in the vicinity of a driver's cab or vehicle.

Figure 10:
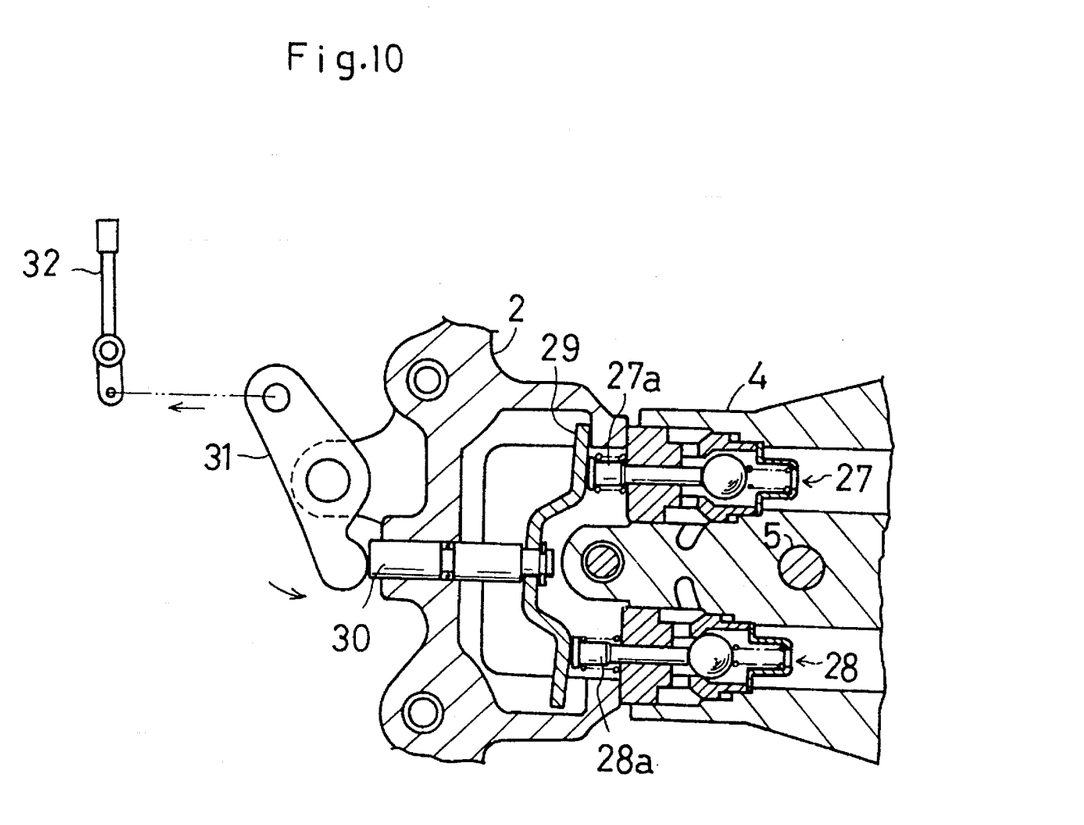
FIG. 10 is another cross-sectional plan view of the same in the by-pass transition mode.
Figure 11:
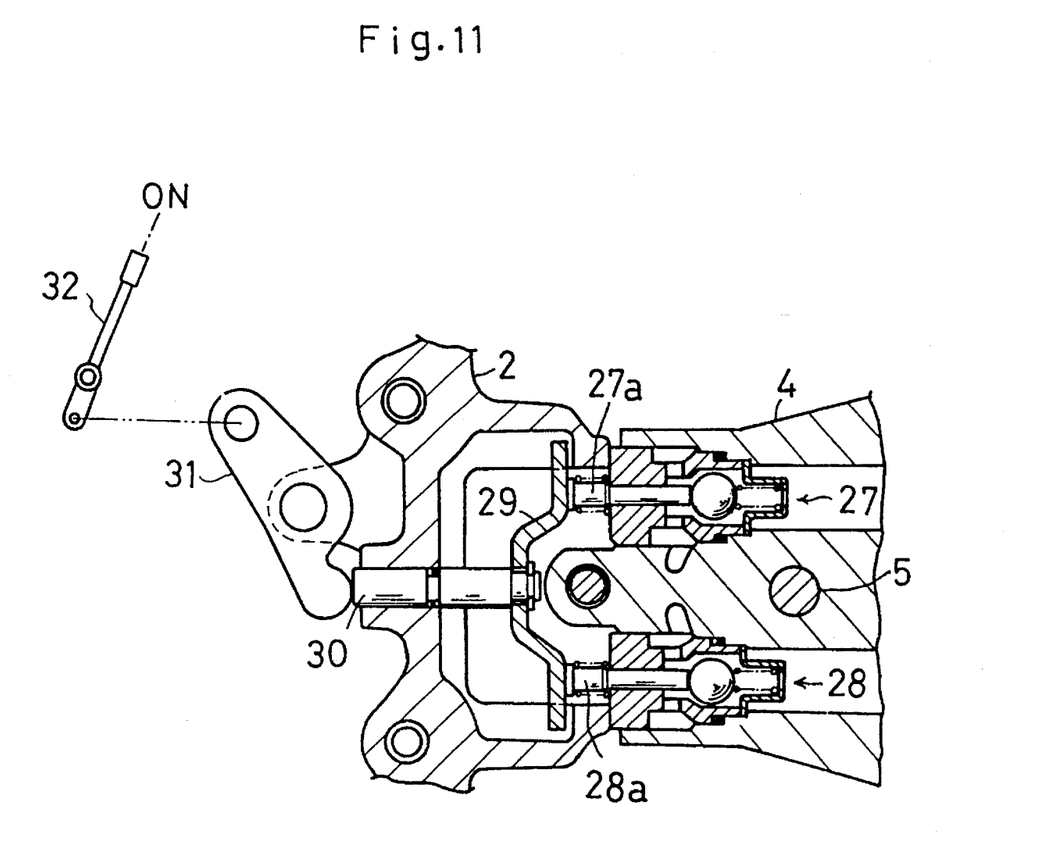
FIG. 11 is another cross-sectional plan view of the same in the by-pass mode.

When by-pass lever 32 is rotated halfway for gaining traction or the like, as shown in FIG. 10, and when the oil in oil passage 4a is at low pressure, urging plate 29 rotates around push pin 30. The abutting end of opening pin 28a acts as a fulcrum, and check valve 27 opens first. When by-pass lever 32 is further rotated, as shown in FIG. 11, urging plate 29 rotates. The abutting end of opening pin 27a acts as a fulcrum, thereby opening check valve 28 at the high pressure side. Hence, pressure oil in the closed circuit flows into the housing to make hydraulic motor M freely rotatable, whereby axles 3L and 3R driven thereby become freely rotatable to enable traction.

One end of output shaft 11 of hydraulic motor M projects outwardly from the housing. A braking mechanism is attached to the projecting end of output shaft 11, which will be explained in FIGS. 7 and 8. A brake disc 15 is fixed on the projecting end of output shaft 11. At upper housing member 1 and at the inner surface of brake disc 15 is provided a fan-shaped brake surface 1e. Brake surface 1e may be directly attached to the housing, or a fan-shaped friction plate may be built in the housing.

Figure 7:
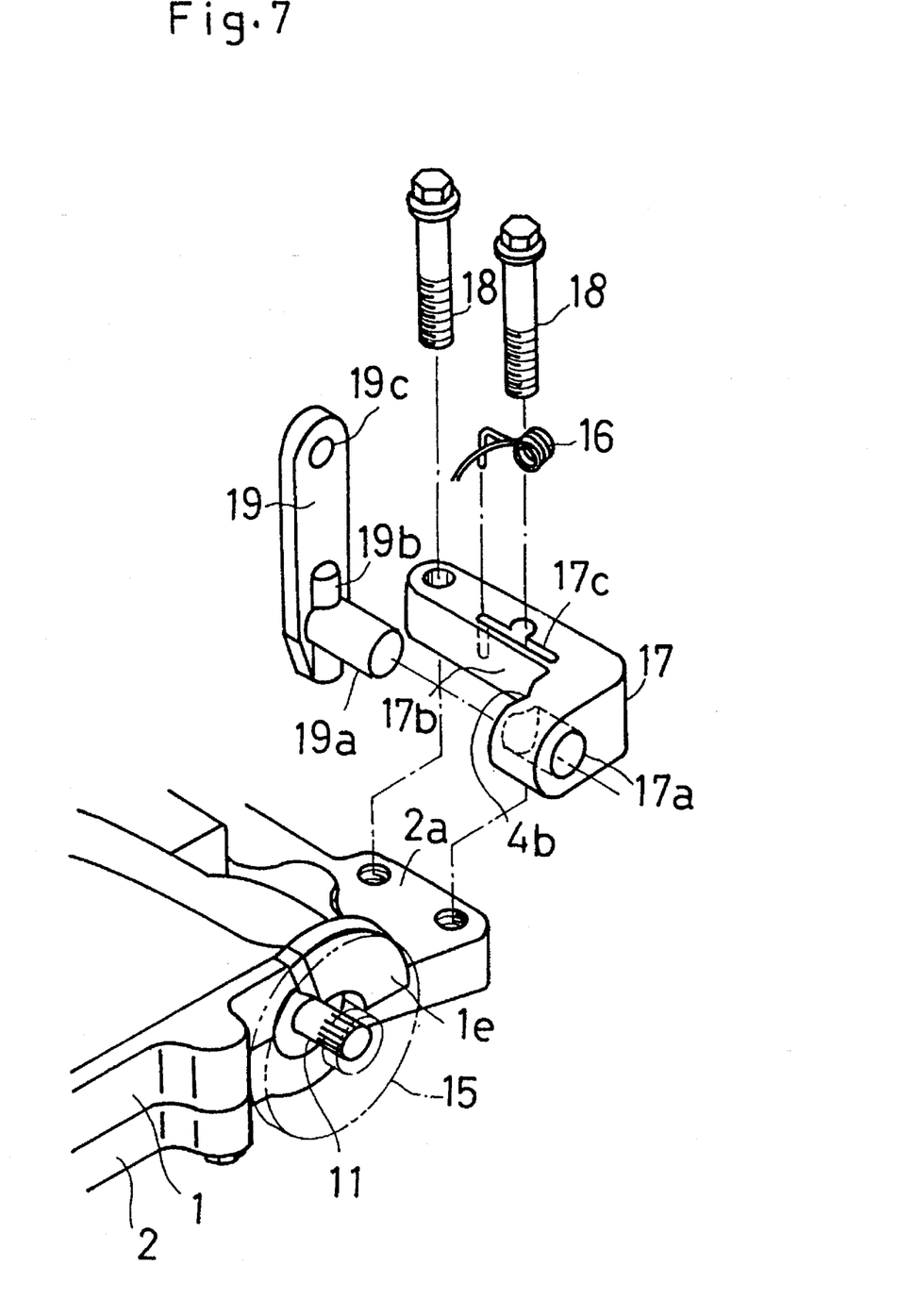
FIG. 7 is a perspective exploded view of a braking device of the present invention.
Figure 8:
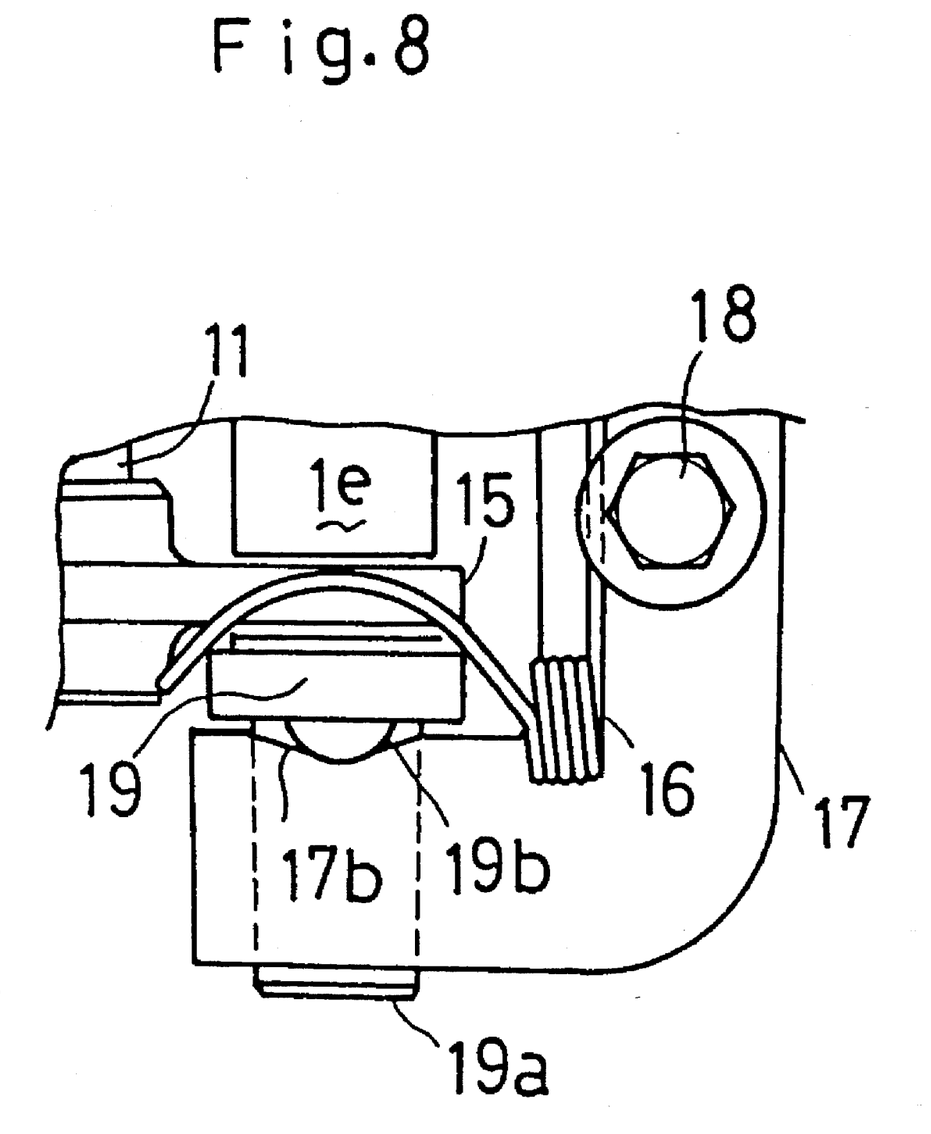
FIG. 8 is a plan view of the braking device of FIG. 7 when not operating.

A bracket 2b is formed at lower housing member 2 and an L-like-shaped stay 17 screwed to bracket 2b by screws 18. A pivot portion 19a at a brake lever 19 is inserted into an insertion bore 17a at stay 17. A cam projection 19b is located at the base of pivot portion 19a, so that, when brake lever 19 is vertical, cam projection 19a is positioned at the deepest portion of a cam groove 17b formed at one side of insertion bore 17a of stay 17. Thus, brake lever 19 pivoted at stay 17 is disposed opposite to the upper surface of brake disc 15. A spring 16 is inserted and fixed at the base thereof in a groove 17c at stay 17, both curved operating ends of spring 16 are retained to brake lever 19 so that brake lever 19 is biased axially and in the rotation direction, that is, becomes vertical and is biased in the not-braking direction. A brake operating wire (not shown) or the like is connected into an insertion bore 19c at the upper portion of brake lever 19, so that, when an operator performs braking operation at a driver's cab, the brake operating wire is pulled to rotate brake lever 19.

As shown in FIGS. 7 and 8, brake lever 19 rotates around pivot portion 19a as the fulcrum, and cam projection 19b rises on a shoal from the deepest portion of cam groove 17b. Thus, brake lever 19 moves by stay 17 and is pressed toward brake disc 15. Brake lever 19 biases brake disc 15 onto brake surface 1e, whereby brake disc 15 is applied with a braking force to stop rotation of output shaft 11. Thus, the brake unit provided at output shaft 11 projecting outwardly from the housing of the axle driving system is simplified in construction, easy to process parts, and has durability even for long use. Also, the brake lever itself corresponds to conventional urging member, whereby the number of parts decreases and a low manufacturing cost is expected.

What is claimed is:

1. An axle driving system, comprising:
   a housing;
   a hydraulic non-stage transmission disposed within said housing;
   fluid stored in said housing;
   an axle disposed within said housing, wherein said hydraulic non-stage transmission and said axle are drivingly connected to each other; and
   fluid storage means disposed on said housing, said fluid storage means including:
   (a) an enclosure extending outwardly from an upper wall of said housing;
   (b) fluid disposed within said enclosure;
   (c) a lid attached to an opening in said enclosure for sealing said enclosure; and
   (d) a bore disposed in said upper wall of said housing within said enclosure, wherein said bore allows said fluid disposed within said enclosure to freely flow into and out of said housing and said fluid storage means.

2. An axle driving system as set forth in claim 1, wherein said enclosure is integrally formed with said upper wall of said housing.

3. An axle driving system as set forth in claim 2, wherein said housing comprises:
   an upper housing member and a lower housing member attached to each other, wherein said enclosure is disposed on said upper housing member.

4. An axle driving system as set forth in claim 3, wherein said enclosure is molded with said upper housing member.

5. An axle driving system as set forth in claim 1, wherein said lid includes a means for observing fluid quantity disposed within said enclosure.

6. An axle driving system as set forth in claim 1, wherein said lid includes a breather means to allow said enclosure to be ventilated with air outside said system.

7. An axle driving system, comprising:
   a housing having an upper housing member and a lower housing member fixed to each other and forming a first chamber and a second chamber;
   a hydraulic non-stage transmission disposed within said housing;
   fluid stored in said housing;
   an axle disposed within said housing, wherein said hydraulic non-stage transmission and said axle are drivingly connected to each other; and
   fluid storage means disposed on said upper housing member, said fluid storage means including:
   (a) an enclosure extending outwardly from the exterior of said upper housing member;
   (b) fluid disposed within said enclosure;
   (c) a lid attached to an opening in said enclosure for sealing said enclosure; and
   (d) a bore disposed on the exterior of said upper housing member within said enclosure, wherein said bore allows said fluid disposed within said enclosure to freely flow into and out of at least said first chamber and said fluid storage means.

8. An axle driving system as set forth in claim 7, wherein said enclosure is integrally formed with the exterior of said upper housing member.

9. An axle driving system as set forth in claim 8, wherein said enclosure is molded with said upper housing member.

10. An axle driving system as set forth in claim 7, wherein said lid includes a means for observing fluid quantity disposed within said enclosure.

11. An axle driving system as set forth in claim 7, wherein said lid includes a breather means to ventilate said enclosure with air outside said system.

12. An axle driving system, comprising:

a housing, wherein said housing is partitioned into a first chamber and a second chamber;

a hydraulic non-stage transmission disposed within said first chamber;

fluid stored in said housing;

an axle disposed within said housing, wherein said hydraulic non-stage transmission and said axle are drivingly connected to each other;

means for transmitting power from said hydraulic non-stage transmission to said axle disposed within said second chamber; and fluid storage means disposed on said housing, said fluid storage means including:
  (a) an enclosure extending outwardly from an upper wall of said housing;
  (b) fluid disposed within said enclosure;
  (c) a lid attached to an opening in said enclosure for sealing said enclosure; and
  (d) a bore disposed in said upper wall of said housing within said enclosure, wherein said bore allows said fluid disposed within said enclosure to freely flow into and out of said first chamber and said fluid storage means.

13. An axle driving system, comprising:

a housing, wherein said housing is partitioned into a first chamber and a second chamber;

a hydraulic non-stage transmission disposed within said first chamber;

fluid stored in said housing;

an axle disposed within said housing, wherein said hydraulic non-stage transmission and said axle are drivingly connected to each other;

means for transmitting power from said hydraulic non-stage transmission to said axle disposed within said second chamber; and fluid storage means disposed on said housing, said fluid storage means including:
  (a) an enclosure extending outwardly from an upper wall of said housing;
  (b) fluid disposed within said enclosure;
  (c) a lid attached to an opening in said enclosure for sealing said enclosure; and
  (d) a plurality of bores disposed in said upper wall of said housing within said enclosure, wherein one of said plurality of bores allows said fluid disposed within said enclosure to freely flow into and out of said first chamber and said fluid storage means, and wherein the other of said plurality of bores allows said fluid disposed within said enclosure to freely flow into and out of said second chamber and said fluid storage means.

14. An axle driving system, comprising:

a housing having an upper housing member and a lower housing member fixed to each other and forming a first chamber and a second chamber;

a hydraulic non-stage transmission disposed within said first chamber;

fluid stored in said housing;

an axle disposed within said housing, wherein said hydraulic non-stage transmission and said axle are drivingly connected to each other;

means for transmitting power from said hydraulic non-stage transmission to said axle disposed within said second chamber; and fluid storage means disposed on said upper housing member, said fluid storage means including:
  (a) an enclosure extending outwardly from the exterior of said upper housing member,
  (b) fluid disposed within said enclosure;
  (c) a lid attached to an opening in said enclosure for sealing said enclosure; and
  (d) a bore disposed on the exterior of said upper housing member within said enclosure, wherein said bore allows said fluid disposed within said enclosure to freely flow into and out of at least said first chamber and said fluid storage means.

15. An axle driving system, comprising:

a housing having an upper housing member and a lower housing member fixed to each other and forming a first chamber and a second chamber;

a hydraulic non-stage transmission disposed within said first chamber;

fluid stored in said housing;

an axle disposed within said housing, wherein said hydraulic non-stage transmission and said axle are drivingly connected to each other;

means for transmitting power from said hydraulic non-stage transmission to said axle disposed within said second chamber; and fluid storage means disposed on said upper housing member, said fluid storage means including:
  (a) an enclosure extending outwardly from the exterior of said upper housing member,
  (b) fluid disposed within said enclosure;
  (c) a lid attached to an opening in said enclosure for sealing said enclosure; and
  (d) a plurality of bores disposed on the exterior of said upper housing member within said enclosure, wherein one of said plurality of bores allows said fluid disposed within said enclosure to freely flow into and out of said first chamber and said fluid storage means, and wherein the other of said plurality of bores allows said fluid disposed within said enclosure to freely flow into and out of said second chamber and said fluid storage means.

* * * * *